Figure 1:
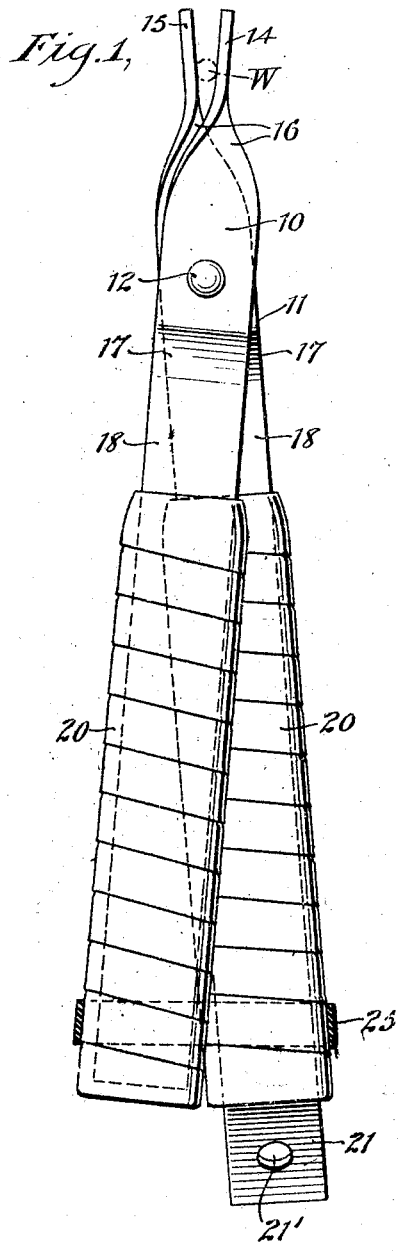

H. F. KUNTZMANN.
ELECTRIC WELDING TONGS.
APPLICATION FILED NOV. 26, 1918.

1,314,674.

Patented Sept. 2, 1919.

WITNESSES
Edw. Thorpe
Geo. R. Beeler

INVENTOR
Henry F. Kuntzmann
BY
ATTORNEYS

UNITED STATES PATENT OFFICE.

HENRY F. KUNTZMANN, OF BROOKLYN, NEW YORK.

ELECTRIC WELDING-TONGS.

1,314,674.     Specification of Letters Patent.     Patented Sept. 2, 1919.

Application filed November 26, 1918. Serial No. 264,171.

*To all whom it may concern:*

Be it known that I, HENRY F. KUNTZMANN, a citizen of the United States, and a resident of the city of New York, Bath Beach, borough of Brooklyn, in the county of Kings and State of New York, have invented new and Improved Electric Welding-Tongs, of which the following is a full, clear, and exact description.

This invention relates to tools or implements used in the art of electric welding or the like, and has particular reference to a novel type of tongs intended to be held and used in one hand.

Among the objects of the invention is to provide a pair of welding tongs having metallic portions adapted to serve best for electrical purposes, and also having jaws peculiarly shaped with respect to the work or wire to be held and for the best manipulation by the operator according to whether he is right handed or left handed.

A further object of the invention is to provide a pair of electric welding tongs the metallic portions of which are so made as to be not only cheap and easy of construction, but strong in practice and having handle portions peculiarly covered to protect the operator from heat and electric shock.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 2:
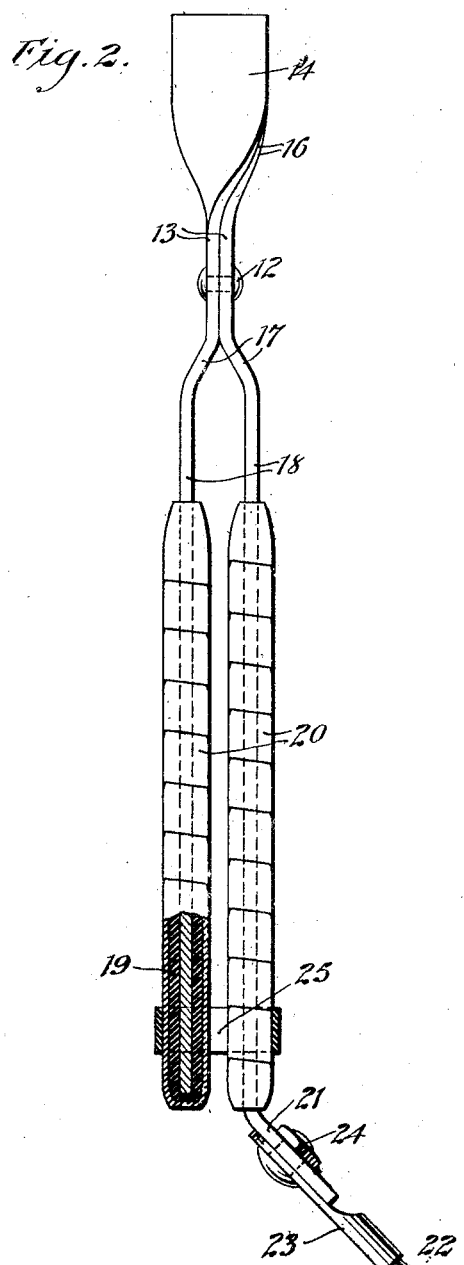

Figure 1 is a plan view of the principal parts of my tongs indicating the position thereof in practice; and Fig. 2 is an edge view of the same looking from the right in Fig. 1.

Referring now more particularly to the drawings, I show a pair of tongs comprising upper and lower blade members 10 and 11 made preferably from flat bar metal and pivoted together at 12.

Each blade member comprises a flat portion 13 bearing directly against a similar portion of the other blade adjacent to the pivot, these portions meeting in a horizontal plane perpendicular to the pivot. Outward from the flat portions 13 are formed two jaws 14 and 15 the points of which are or may be substantially flat while the parts 16 between the points of the jaws and the flat portions 13 are bent spirally so that the flat points of the jaws occupy vertical planes or planes coinciding with the axis of the pivot. As plainly shown, these spirals 16 are left handed in a pair of tongs made for a right handed operator, that is to say each jaw is twisted to the left or counter-clockwise with respect to the flat portion 13 which may be held in a vise for this purpose. Since the jaws are both bent in the same direction they coöperate closely together all the way from the pivot to the points of the jaws, and thereby a very small wire or other article may be gripped between them reliably.

In the practice of this tool a piece of wire W is gripped between the jaws and being so held is brought down into contact with the metal to be welded so as to establish a circuit through the tongs and wire and thereafter the active point of the wire is held at a short distance from the joint being welded. The merit of an electric weld depends largely upon the steadiness with which the point of the wire is maintained or held from the work, and hence the operator must not only be skilful in knowing and watching his work, but also he must be assisted as much as possible in the character of the tools with which he operates. The tongs, therefore, are held substantially in a horizontal plane and below the level of the operator's eyes. For this purpose his hand grasping the tongs reaches around and beneath the handles, the palm of the hand bearing against the right side of the lower handle while the fingers embrace the left edge or side of the upper handle in the most convenient position for gripping the handles. With the hand in this position the thumb may lie anywhere along the upper handle and so be in position to bear laterally or toward the left against the right edge of the upper handle whereby while the lower handle is held steady in the palm of the hand the upper handle will be swung to the left causing the jaws to open and release the wire when desired.

Rearward from the pivot 12 and flat portions 13 the handles diverge from each other at 17 so that the metallic portions of the main handles lie in spaced parallel horizontal planes as indicated at 18. The space between these planes is sufficient to accommodate any suitable protecting covering for the handles. For this purpose I employ for each handle a layer or coating 19 of asbestos or some other suitable insulating and heat resisting material. This layer or coating of asbestos is held in place by means of a binding strip 20 in the nature of tire tape or the like wrapped around the same from one end of the protected portion of the handle to the other. The tire tape serves, therefore, not only to hold the asbestos pad in place, but in itself constitutes an excellent surfacing material for a hand grip.

The inner end of one of the blades, preferably the lower blade 11, is provided with a downwardly projecting heel 21 having a hole 21' through which the conductor 22 is anchored to the tongs through a connector 23 and a bolt or rivet 24 passing through the hole 21'. This heel portion is deflected downward in a plane at an angle of about forty degrees to the plane of the blade 11 and so the conductor 22 is held to the tongs in a most convenient position. If desired an elastic strap or band 25 may be passed around the inner ends of the handles the tendency of which is to assist in holding the jaws gripping the wire thereby relieving the operator's hand in proportion to the strength of the elastic.

While I show and describe a pair of tongs designed especially for a right handed operator, it will be understood that for a left handed welder the spiral portions of the jaws will be bent in the opposite direction from those indicated, and hence the upper handle will be movable toward the right by the operator's thumb instead of to the left as shown in order to release the article held by the jaws.

While I do not wish to be unnecessarily limited as to the materials employed in the manufacture of these tongs I have found that copper is well adapted for the purpose of making the blades for several reasons: First, it is a good conductor of electricity, and, secondly, it is sufficiently soft and malleable to enable the operator to readily bend or shape the active portions of the jaws at any time to conform to a piece of wire or device to be held irrespective of its size or shape. Even though the jaws may be made of copper the tool as a whole is sufficiently stiff and strong because of the flat metal structure to meet all ordinary requirements. My tongs, in addition to their use for electric welding, may be used also to good advantage for electric carbon cutting or carbon welding of metals.

I claim:

1. The herein described electric welding tongs comprising two blade members pivoted together and including a pair of jaws formed beyond the pivot and adapted to lie directly against each other all the way from the pivot to the points of the jaws, and one of the blade members having an integral heel member formed in a plane at an oblique angle to the plane of the blade for the connection of a conductor.

2. In a pair of electric welding tongs comprising two blade members formed of flat metal stock, a pivot connecting the blades, the portions of the blades adjacent to the pivot being flat and directly in contact with each other while the handle portions of the blades are spaced from each other, a padding of insulating material surrounding each handle, means wrapped around the insulating material to hold the same in place, and means to attach a conductor to one of the handles.

3. A pair of tongs of the class set forth comprising two handle members and means pivoting them together, a padding of asbestos surrounding each handle, means surrounding the asbestos to hold the same in place and provide a hand grip, means extending through and beyond one of the handle coverings for the attachment of a conductor, and an elastic member surrounding the handles and tending to close the jaws of the tongs.

HENRY F. KUNTZMANN.